Figure 1:
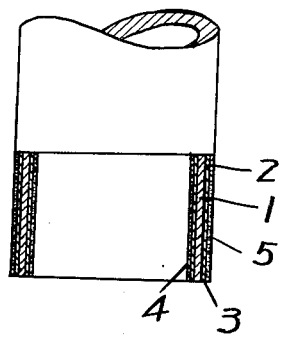

May 29, 1962  CHIHIRO KAWASHIMA ETAL  3,036,929
METHOD OF MANUFACTURING DURABLE LANCE
PIPES FOR OXYGEN SMELTING
Filed Oct. 30, 1959

INVENTORS
Chihiro Kawashima
and
BY Hiroshi Nakahira,
Pierce, Scheffler & Parker,
their Attorneys 3,036,929
METHOD OF MANUFACTURING DURABLE
LANCE PIPES FOR OXYGEN SMELTING
Chihiro Kawashima, Tokyo, and Hiroshi Nakahira, Nishinomiya City, Japan, assignors to Toyo Calorizing Kogyo Kabushiki Kaisha, Kobe City, Japan
Filed Oct. 30, 1959, Ser. No. 849,970
Claims priority, application Japan Apr. 22, 1959
2 Claims. (Cl. 117—70)

This invention relates to heat and oxidation protective treatments of lance pipes for supplying oxygen for oxygen smelting of steels. According to our invention a heat resistant coating which has affinity for open hearth slag or electric arc furnace slag and thermal insulating properties is applied to the outer surface of a calorized lance pipe, thereby preventing the transmission of heat to the inside wall of the lance pipe and thus maintaining the temperature of said inner wall at a relatively low point. When the coated lance pipe is used in the open hearth or electric arc furnace, a large amount of molten slag adheres to the outer surface thereof and due to the thermal insulating effect of this slag and of the outer coating the drastic scaling and combustion of the lance pipe in contact with the oxygen is avoided or reduced. Meanwhile, a refractory coating which has good thermal conductivity and high oxidation resistance is applied to the inner surface of the lance pipe, thereby minimizing the drastic scaling and combustion in contact with oxygen gas at the high temperature without reducing the cooling effect, on the inner surface of the lance pipe, by the oxygen passed through at a high velocity during the oxygen injecting. Thus, due to both effects of these different coatings, a stable lance pipe of excellent durability is provided.

Heretofore, the usual lance pipes made of mild steel and which have been subjected to a suitable calorizing treatment have given high durability against oxidation losses at a high temperature and such pipes are widely used for injecting oxygen into open hearth and electric arc furnaces for steel production, but this type of the lance has generally the following disadvantages:

(1) The consumption of the calorized lance is greatly influenced by complicated factors such as oxygen injection pressure, quantity and flowing velocity of oxygen, temperatures of the furnace atmosphere and the molten steel, physical conditions of the melt and slag, operating time, kind of steel, manual condition of handling the lance and the like. Therefore if any of these factors is changed there are many cases in which the same product exhibits a considerable difference in the rate of consumption.

(2) If a high oxygen gas pressure (above 6 kgs./cm.$^2$) is used for oxygen smelting the cooling effect of the oxygen on the inner surface of the lance is quite high so that the melting of the lance is substantially avoided and the consumption of lance due to the combustion and scaling is minimized and the durability is increased, but in the high oxygen gas pressure injection many splashes of the molten slag or steel containing a considerable amount of oxygen are scattered violently to attach to the roof and inside walls of the furnace so that the roof and walls of the furnace are considerably attacked and the durability of furnace is reduced. For this reason, some shops are inevitably forced to employ low pressure injection (below 5 kgs./cm.$^2$) which results in an increase of consumption of the lance.

(3) In oxygen smelting a large amount of molten slag adheres to the outer surface of the lance pipe; such slag consists mainly of CaO, SiO$_2$, FeO, MnO, MgO, Al$_2$O$_3$ and is refractory and has a comparatively high adhesivity and a large heat insulating effect so that the adhered slag prevents the melting of the pipe material and calorizing layer coated thereon. At the same time the slag coating retards the heat transmission to the inner surface of the pipe so that its temperature is reduced, thereby reducing the drastic scaling and combustion of the lance in contact with oxygen gas at high temperatures. On the contrary, if the slag does not adhere to the outer surface of the lance, the lance directly contacts with molten steel so that the scaling and combustion on the inner wall of the lance is accelerated notwithstanding the fact that the inner surface of the lance is continously cooled by oxygen. At the same time there is a strong tendency to rapidly reach an equilibrium state due to the inherent property of metals so that the danger of fusing the lance material and the calorized layer applied thereto is increased.

(4) The calorized layer usually increases its durability in proportion to the increase of aluminum content, but on the contrary, its melting point gradually becomes low. Accordingly in case of operative conditions if the aluminum content of the alloy layer exceeds a certain limit, the melting point coincides with the temperature at the inner surface of the tip of the lance or becomes lower than that at which the alloy layer begins to melt so that the durability of the calorized lance is naturally limited and cannot be increased.

It is an object of the present invention to provide a method for eliminating these drawbacks and simultaneously improving the durability of the calorized steel lance to the extent of 2 or 3 times.

The calorized pipes are uniformly coated on the outer surface and inner surface, respectively, with the specially blended refractory materials. The outer coating and the inner coating are respectively provided as follows:

(1) *The coating on the outer surface of the lance.*—
Select a mixture of 30 to 70 parts of powders of about 200 mesh of silicate or refractory materials such as mullite, spinel, forsterite, kaolin or agalmatolite and 70 to 30 parts of quartz of about 100 mesh. To this mixture a suitable amount of sodium silicate or potassium silicate as a bonding material is added and completely blended. Then, this mixture is uniformly coated on the outer surface of the lance to a thickness of 0.3 to 2 mm. and air dried.

(2) *The coating on the inner surface of the lance.*—
Select a mixture of 30 to 70 parts of powder of about 100 mesh and 70 to 30 parts of a powder of about 200 mesh, both powders being of the same composition and consisting of oxides, carbides, silicides, borides or nitrides having more than 95% purity. To 100 parts of this mixture, about 1 to 10 parts of powder of silicate such as kaolin, or gaerome clay as a mill-addition and 10 to 30 parts of sodium silicate or potassium silicate as a bonding material and 10 to 20 parts of water so as to give a fluidity to this mixture and 1 to 10 parts of graphite, silicon carbide or metal powders in order to improve the thermal conductivity are added and completely blended. Then this slurry mixture is uniformly coated on the inner surface of the lance to a thickness of about 0.4 mm. and air dried.

After these coatings are provided, they are dried further by hot air at 50 to 100° C. for several hours.

Figure 2:
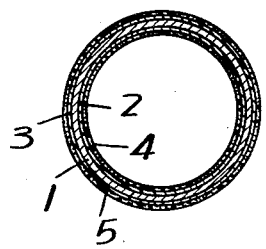

For a better understanding of this invention, reference is had to the accompanying drawing, in which FIG. 1 is a partial sectional elevation of the calorized lance pipe having refractory coatings on both of inner and outer surfaces, respectively, according to this invention and FIG. 2 is its cross sectional view.

According to this invention, mild steel lance is calorized and further protective coatings are applied to the outer and inner surfaces, respectively, of the pipe 1, as above described.

In FIG. 1 and FIG. 2:

1 ———————————————————— Base metal.
2 ———————————————————— Calorized layer.
3 ———————————————————— Calorized layer.
4 ———————————————————— Inner coating.
5 ———————————————————— Outer coating.

In the oxygen smelting, using this type of the lance in an open hearth or electric arc furnace, the outer surface of the lance is encircled from its tip successively by the molten steel, molten slag and furnace atmosphere. On the other hand the inner surface is heated to a high temperature by the thermal conduction and oxygen gas of high purity and at high velocity is passed therethrough so that the operative conditions of the external surface and internal surface of the lance are very different. In accordance with this invention, two kinds of different refractory coatings having apparently different properties are applied to the external and internal surfaces of the lance pipes respectively. The ceramic coating applied to the external surface has high heat resistance, high melting point and strong adhesivity and does not crack or split as a result of the violent thermal shock to which it is subjected. Moreover it has a great affinity for the open hearth or electric arc furnace slags so that a large amount of such slag adheres thereon to improve further its own heat insulating effect. During the oxygen injecting operation by this lance in the steel-making a large amount of the slag always adheres to the external surface of the lance on which the coating was applied, thus retarding the heat transmission by the combined effect of the adhered slag and the heat insulating coating, thereby minimizing the temperature increase on the inner surface of the pipe. This results in the advantageous effects of suppressing the violent chemical reaction between the flowing oxygen and the inner surface of the pipe. Moreover, by using silica of larger grain size than those of the other refractory materials to properly distribute the grains of mixed ceramic materials the strength of the coating itself is increased. As the result, the lance pipe thus coated according to this invention can resist cracking or splitting due to mechanical shock or friction at room temperature and when it is used in an open hearth or an electric furnace the occurrence of cracking or splitting of the coating due to the thermal shock is minimized. Moreover, even when the pipe is taken out from the furnace after using the splitting off of the coated layer together with the adhered slag is avoided.

The inner ceramic coating applied according to this invention has a higher refractivity, a high melting point and greater adhering strength so that cracking and splitting due to thermal shock is avoided. It has a high thermal conductivity and oxidation resistance so as not to reduce the cooling effect of the oxygen passed through the lance at the high velocity. Therefore, it has a great advantage that it can conspicuously reduce the drastic scaling and combustion of the lance in contact with the oxygen at the high temperatures.

The selection of the grain size of the ceramic materials for the inner surface as above described serves to increase the strength of the coating itself and the use of higher purities such as higher than 95% is specially advantageous due to the fact that a substance of lower thermal purity has a lower thermal conductivity and accordingly reduces cooling effect of the oxygen passed through the calorized lance so that it gives an adverse effect on the durability of the pipe. The addition of water and reducing the adhesive agent are advantageous due to the fact that if the adhesive agent is excessive the drying speed becomes not only slow but it is also liable to cause cracking of the coating when it is dried and the water of crystallization contained in the coating is heated to a high temperature during the use so that the coating expands suddenly and is blown off by the oxygen passed through at a high velocity. Thus the above phenomena can be perfectly avoided by reducing the adhesive agents and by adding the above defined parts of water. Then no trouble occurs in the coating when the lance is used in an open hearth or electric arc furnace.

The reason why a compound of high purity is added with the above defined parts of graphite, silicon carbide or metal powders is to provide better thermal conductivity for the inner coating and to further increase the cooling effect of oxygen passed through the inner surface of the calorized lance, thereby increasing the durability.

The step, after air drying of the ceramic coating layers applied to the inner and outer surfaces of the calorized lance of further drying it by hot air in a drier is important since otherwise it is impossible to provide sufficient dry strength of the coating.

The results of comparative tests on durability made on the lance pipe coating according to this invention and that of known method are shown in the following table:

|  |  | Consumed, percent | Actual consumption, mm./min. | Durability ratio |
|---|---|---|---|---|
| Known method | Mild steel pipe | 100 | 400 | 1 |
|  | Calorized pipe | 30–20 | 60 | 3–5 |
| This invention | Ceramic coating pipe | 10 | 30 | 10 |

We claim:
1. A method of making a durable lance for the oxygen smelting of steel which comprises coating the outer surface of a calorized mild steel pipe with a coating composition consisting of 100 parts by weight of a mixture of from 30 to 70 parts by weight of a material of the group consisting of silicates, mullite, spinel, forsterite, kaolin and agalmatolite having a grain size of about 200 mesh and 70 to 30 parts by weight of quartz having a grain size of about 100 mesh with a suitable amount of a bonding material of the group consisting of sodium silicate and potassium silicate and water in quantity sufficient to form a slurry to a thickness of about 0.3 to 2 mm., air drying said outer coating, coating the inner surface of said pipe with a coating composition consisting of 100 parts by weight of a mixture of 30 to 70 parts by weight of a powder of about 100 mesh and 70 to 30 parts by weight of a powder of about 200 mesh of a metal compound of the group consisting of oxides, carbides, silicides, borides and nitrides having a purity of at least 95% with from 1 to 10 parts by weight of a mill addition consisting essentially of a silicate and from 10 to 30 parts by weight of a bonding material of the group consisting of sodium silicate and potassium silicate and from 10 to 20 parts by weight of water and from 1 to 10 parts by weight of a material of the group consisting of graphite, silicon carbide and metal powders to a thickness of about 0.4 mm., air drying said inner coating, and then further drying said two coatings in hot air at 50 to 100° C. for several hours.

2. A durable lance for oxygen smelting of steel consisting of a calorized mild steel pipe having an air dried outer coating having a thickness of from 0.3 to 2 mm. and an air dried inner coating having a thickness of about 0.4 mm., said outer coating consisting of a mixture of from 30 to 70 parts by weight of a material of the group consisting of silicates, mullite, spinel, forsterite, kaolin and agalmatolite having a grain size of about 200 mesh, 70 to 30 parts by weight of quartz having a grain size of about 100 mesh and a suitable amount of a bonding material of the group consisting of sodium silicate and potassium silicate and said inner coating consisting of a mixture of 30 to 70 parts by weight of a powder of about 100 mesh and 70 to 30 parts by weight of a powder of about 200 mesh of a material of the group consisting of metal oxides, carbides, silicides, borides and nitrides having a purity of at least 95%, 1 to 10 parts by weight of a silicate serving as a mill addition, 10 to 30 parts by weight of a bonding material of the group consisting of sodium silicate and potassium silicate and from 1 to 10 parts by weight of a material of the group consisting of graphite, silicon carbide and metal powders.

References Cited in the file of this patent

UNITED STATES PATENTS

| | | |
|---|---|---|
| 1,124,281 | Bradley et al. | Jan. 12, 1915 |
| 2,391,468 | Long | Dec. 25, 1945 |
| 2,897,096 | Karatzas et al. | July 28, 1959 |